United States Patent
Torata et al.

(10) Patent No.: US 6,344,294 B1
(45) Date of Patent: Feb. 5, 2002

(54) PROCESS FOR PREPARING A POSITIVE ELECTRODE ACTIVE MATERIAL FOR A NONAQUEOUS SECONDARY BATTERY BY FORMING AN OXALATE PRECIPITATE

(75) Inventors: Naoto Torata, Kashihara; Takehito Mitate, Yamatotakada, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/426,722

(22) Filed: Oct. 26, 1999

(30) Foreign Application Priority Data

Oct. 27, 1998 (JP) .............................. 10-304979

(51) Int. Cl.[7] .......................... H01M 4/04; H01M 4/26; C01G 53/04

(52) U.S. Cl. ................... 429/223; 429/231.1; 423/140; 423/594

(58) Field of Search .............................. 429/231.1, 223; 423/592–594, 140

(56) References Cited

U.S. PATENT DOCUMENTS 6,015,637 A * 1/2000 Mitate et al.
6,103,421 A * 8/2000 Torata et al.

FOREIGN PATENT DOCUMENTS

| JP | 2-40861 | 2/1990 |
| JP | 5-205741 | 8/1993 |
| JP | 5-251079 | 9/1993 |
| JP | 6-44970 | 2/1994 |
| JP | 6-44971 | 2/1994 |
| JP | 6-96769 | 4/1994 |
| JP | 6-203834 | 7/1994 |
| JP | 8-31418 | 2/1996 |
| JP | 9-156931 | 6/1997 |
| JP | 10-106564 | 4/1998 |

OTHER PUBLICATIONS

Ohzuku et al, "Synthesis and Characterization of $LiNiO_2$, etc." *Chemistry Express*, vol. 6, No. 3, p. 161., 1991, No Month Available.

Dyer et al, "Alkali–Metal–Nickel Oxides of the Type $MNiO_2$", *J. Am. Chem. Soc.*, 76, 1954, pp. 1499–1503, No month.

* cited by examiner

Primary Examiner—Carol Chaney
Assistant Examiner—Susy Tsang
(74) Attorney, Agent, or Firm—Nixon & Vanderhye (57) ABSTRACT

A process for producing a positive electrode active material for a nonaqueous secondary battery comprising the steps of: dissolving compounds capable of providing lithium ions, nickel ions and optionally ions of at least one element selected from the group consisting of transition metals,-3B-group elements, 4B-group elements and 5B-group elements in a buffer solution containing at least lithium ions, thereby to prepare a starting aqueous solution; adding an oxalic acid to the starting aqueous solution to form a precipitate of oxalates of said ions and separating the precipitate; calcining the resulting precipitate to produce $LiNI_{1-x}M_xO_2$, wherein $0 \leq X < 0.5$ and M is at least one element selected from the group consisting of the transition metals, 3B-group elements, 4B-group elements and 5B-group elements; and re-using a residual liquid after the precipitate is separated for preparing the starting aqueous solution.

7 Claims, 6 Drawing Sheets

PROCESS FOR PREPARING A POSITIVE ELECTRODE ACTIVE MATERIAL FOR A NONAQUEOUS SECONDARY BATTERY BY FORMING AN OXALATE PRECIPITATE

CROSS-REFERENCE TO RELATED APPLICATION

This application is related to Japanese application No. HEI10(1998)-304979 filed on Oct. 10, 1998, whose priority is claimed under 35 USC §119, the disclosure of which is incorporated by reference in its entirety.

BACKGROUND OF THE INVENTION

1. Field of the Invention

The present invention relates to a process for preparing a positive electrode active material for a nonaqueous secondary battery and a nonaqueous secondary battery using the active material. More particularly, it relate to a process for producing $LiNi_{1-x}M_xO_2$, wherein $0 \leq X < 0.5$ and M is at least one element selected from transition metals and 3B-, 4B- and 5B- group elements, and a nonaqueous secondary battery using $LiNi_{1-x}M_xO_2$ as a positive electrode active material.

2. Description of Related Arts

The following are reported as conventionally typical processes for preparing lithium nickel oxide ($LiNiO_2$).

In an example of the process for preparing $LiNiO_2$ shown in the Journal of the American Chemical Society (J.Am.Chem.Soc.), 76,1499(1954), solid anhydrous lithium hydroxide and metallic nickel are mixed and calcined in an atmosphere of air.

In an example of the process for preparing $LiNiO_2$ disclosed by Japanese Unexamined Patent Publication No. HEI 2(1990)-40861, solid lithium hydride monohydrate and solid nickel oxide are mixed. The resulting mixture is first calcined at 600° C. in an atmosphere of air, and then the calcined mixture is pulverized and calcined again at 600° C. to 800° C.

In an example of the process for preparing $LiNiO_2$ disclosed by Japanese Unexamined Patent Publication No. HEI 5(1993)-205741, solid lithium peroxide and nickel oxide are mixed and calcined at 750° C. or lower, followed by quenching.

In an example of the process for preparing $LiNiO_2$ disclosed by Japanese Unexamined Patent Publication No. HEI 5(1993)-251079, solid lithium nitrate is mixed with at least one of solid nickel hydroxide and nickel oxyhydroxide and the resulting mixture is calcined at 500° C. to 1,000° C.

In an example of the process for preparing $LiNiO_2$ disclosed by Japanese Unexamined Patent Publication No. HEI 6(1994)-203834, nickel acetate and lithium acetate are dissolved in ethylene glycol with heating and solidified by heating further. The resulting mixture is thermally treated at 400° C. in air, pulverized and calcined at 700° C. in a stream of oxygen. The calcined mixture is calcined again at 800° C. in a stream of oxygen.

In an example of the process for preparing $LiNiO_2$ shown in the Chemistry Express, 6,161(1991), 4.5M lithium hydroxide aqueous solution and 1.0M nickel nitrate aqueous solution are mixed equimolarly at 60° C. The resulting solution is evaporated to dryness by stirring under reduced pressure. The resulting solid is pulverized, and calcined preliminarily at 300° C. and then at 800° C.

In an example of the process for preparing a composite oxide of lithium and nickel disclosed by Japanese Unexamined Patent Publication No. HEI 6(1994)-44970, to a saturated aqueous solution of at least one nickel salt selected from a halogenated nickel, nickel sulfate, nickel phosphate, nickel acetate and nickel oxalate, added is a saturated aqueous solution of at least one lithium salt selected from lithium hydroxide, lithium carbonate and lithium hydrogen carbonate in an equimolar amount with the nickel salt. The resulting mixture is evaporated to dryness with stirring in air or under reduced pressure. The resulting cake-like solid is calcined at 600° C. to 800° C.

In an example of the process for preparing a composite oxide of lithium and nickel disclosed by Japanese Unexamined Patent Publication No. HEI 6(1994)-44971, to powders of at least one nickel compound slightly soluble or insoluble in water selected from nickel oxide, nickel oxyhydroxide, nickel hydroxide and nickel carbonate, added is a saturated aqueous solution of at least one lithium salt selected from a halogenated lithium, lithium nitrate, lithium sulfate, lithium phosphate, lithium borate, lithium acetate and lithium oxalate. The resulting mixture is sufficiently kneaded with stirring. The mixture is evaporated to dryness with stirring in air or under reduced pressure. The resulting cake-like solid is calcined at 600° C. to 800° C.

In an example of the process for preparing $LiNiO_2$ disclosed by Japanese Unexamined Patent Publication No. HEI 6(1994)-96769, a lithium source and a nickel source are mixed so that the ratio of the molar amount of lithium in the lithium source to that of nickel in the nickel source is 1:1. At this time, a small amount of water is added as a dispersant. The resulting mixture is dried and calcined at 650° C. to 800° C.

In an example of the process for preparing $LiNiO_2$ disclosed by Japanese Unexamined Patent Publication No. HEI 9(1997)-156931, powders of nickel oxide and a lithium compound of either lithium hydroxide or lithium nitrate are weighed so that the molar ratio of lithium to nickel is 1:1. The nickel oxide powders are allowed to soak the lithium compound melted at a temperature of melting temperature thereof or higher to 500° C. or lower. The resulting mixture is calcined in the presence of oxygen or an oxygen-rich gas.

Of the above-described processes for producing positive electrode active materials for nonaqueous secondary batteries, in the processes of mixing a lithium compound and a nickel compound in solid states, there is a problem in that the mixed state of both the compounds is not uniform prior to calcination.

In the processes of mixing a lithium compound and a nickel compound in aqueous solutions, the solutes do not precipitate simultaneously while the mixed solution is evaporated to dryness, because the solutes have different solubilities. Therefore, the lithium compound and the nickel compound are not uniformly mixed in the resulting solid.

As regards the process of dissolving nickel acetate and lithium acetate in ethylene glycol with heating, evaporating the resulting solution to dryness with further heating and calcining the resulting solid twice, it is not preferable since it requires a long calcination time and involves complicated production steps. Furthermore, the mixed state of the lithium compound and the nickel compound is still insufficient in the solid obtained by this process before calcination.

In the process of dispersing in a powdery nickel compound slightly soluble or insoluble in water in an aqueous solution of a lithium salt and the process of dispersing and kneading them with stirring a lithium compound and a nickel compound in water, the resulting matter is not a uniform mixture of the lithium compound and the nickel compound because the solutes do not precipitate at the same time while water as a dispersant is being removed.

Also in the process of allowing a melted lithium salt to penetrate into a powdery-nickel oxide, the mixed state of nickel oxide and the lithium salt is somewhat improved, but is still insufficient.

In nonaqueous secondary batteries using matters obtained by calcining insufficiently uniform mixtures as positive electrode active materials, their discharge capacity declines remarkably with increase of the number of charge-discharge cycles, and electrodes thereof deteriorate quickly.

In order to solve the above-mentioned problems, according to the process for producing $LiNiO_2$ disclosed by Japanese Unexamined Patent Publication No. HEI 10(1998)-106564, a water-soluble lithium compound and a water-soluble nickel compound are dissolved in water to prepare an aqueous solution. Subsequently, oxalic acid is added to the resulting aqueous solution to co-precipitate a lithium salt and a nickel salt. The resulting precipitate is dried and then calcined.

By this co-precipitation, the lithium salt and the nickel salt in the precipitate are in a uniformly mixed state. Accordingly, nonaqueous secondary batteries using $LiNiO_2$ obtained by calcining the precipitate as a positive electrode active material are improved in charge-discharge cycle characteristics.

In the above-described process for producing $LiNiO_2$ disclosed by Japanese Unexamined Patent Publication No. HEI 10(1998)-106564, since lithium and nickel are allowed to precipitate in a composite oxalate, it is possible to obtain a precursor in which the lithium compound and the nickel compound are uniformly mixed. However, because lithium oxalate is relatively readily dissolved in water, the molar ratio of lithium to nickel (lithium/nickel) in the precursor varies every time when the precursor is prepared. Therefore reproducibility is not sufficient.

Furthermore, in the step of preparing the aqueous solution of the lithium compound and the nickel compound before oxalic acid is added, the lithium compound as a starting material must be used in an amount about several times to about ten times larger than the nickel compound in terms of the molar ratio of lithium to nickel.

For this reason, although nonaqueous secondary batteries using, as a positive electrode active material, $LiNiO_2$ obtained by calcining the precursor produced by the co-precipitation are improved in an initial discharge capacity and have good charge-discharge cycle characteristics, there are problems that the process fails to provide active materials stable in quality, costs much for starting materials and involves a great waste of resources.

SUMMARY OF THE INVENTION

Under these circumstances, an object of the present invention is to provide a process for producing a positive electrode active material, $LiNi_{1-x}M_xO_2$, for nonaqueous secondary battery which material can exhibit stable charge-discharge characteristics, at a reduced cost without wastage of resources and also to provide a lithium ion secondary battery which can exhibit good charge-discharge characteristics.

According to the process for producing a positive electrode active material for a nonaqueous secondary batteries of the present invention, compounds capable of providing lithium ions, nickel ions and optionally ions of at least one element selected from transition metals and 3B-, 4B- and 5B-group elements are firstly dissolved in a buffer solution containing at least lithium ions to prepare a starting aqueous solution. A dicarboxylic acid is added to the starting aqueous solution to form a precipitate containing salts of the above-mentioned ions with the dicarboxylic acid, and the precipitate is separated. The separated precipitate is calcined to produce $LiNi_{1-x}M_xO_2$, wherein $0 \leq X < 0.5$ and M is at least one element selected from transition metals and 3B-, 4B- and 5B-group elements. Residual liquid after the separation of the precipitate can be re-used for preparing the above-described starting aqueous solution.

With this constitution, since the residual liquid is recycled in the production process of the positive electrode active material, it is possible to reduce costs for raw materials and to use resources effectively.

According to the present invention, there is also provided a nonaqueous secondary battery comprising a positive electrode containing a positive electrode active material produced as described above, a negative electrode and an ion conductor.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The process for producing $LiNi_{1-x}M_xO_2$, wherein $0 \leq X < 0.5$ and M is at least one element selected from transition metals and 3B-, 4B- and 5B-group elements, of the present invention comprises the following steps:

First, compounds capable of providing lithium ions, nickel ions and optionally ions of at least one element selected from transition metals and 3B-, 4B- and 5B-group elements are dissolved in a buffer solution containing at least lithium ions to prepare a starting aqueous solution.

Next, a dicarboxylic acid is added to the starting aqueous solution to form a precipitate containing salts of the above-mentioned ions and the dicarboxylic acid and the precipitate is separated.

Subsequently, the residual liquid after separation of the precipitate is re-used for preparing the above-described starting aqueous solution.

The separated precipitate, after optionally dried, is calcined to produce $LiNi_{1-x}M_xO_2$, wherein $0 \leq X < 0.5$ and M is at least one element selected from transition metals and 3B-, 4B- and 5B-group elements.

According to the above-described process, since the residual liquid discharged when the precipitate is separated, which have conventionally been disposed of, is recycled, costs for raw materials can be reduced and resources can be used effectively.

The residual liquid is preferably recycled for use as the buffer solution. Thereby, it is possible to reduce variations in the molar ratio of the lithium compound and the nickel compound in the precipitate through production lots (i.e., to uniform the mixture state).

If oxalic acid is used as the dicarboxylic acid and oxalic ions are removed from the residual liquid, the re-use of the residual liquid in the step of preparing the starting aqueous solution becomes easy. As a result, the mixed state of the lithium compound and the nickel compound in the precipitate can be more uniformed through the production lots. Accordingly, it is possible to obtain a positive electrode active material for nonaqueous secondary batteries which has stable charge-discharge cycle characteristics.

Especially, if the oxalic ions are removed with calcium acetate, the accuracy of the pH of the residual liquid and the concentration of lithium ions can be improved. In this case, if the acetic ions are removed, the accuracy of the concentration of acetic acid can be improved further. As a result, it is possible to obtain a more uniformly mixed precipitate.

As the dicarboxylic acid in the present invention, any dicarboxylic acid may be used without any particular limitation, provided that it allows lithium and nickel to be precipitated as their salts. As the dicarboxylic acid, oxalic acid may be mentioned, for example. In the present invention, if the dicarboxylic acid is oxalic acid, it is possible to produce the positive electrode active material more effectively.

The way of separating the precipitate is not particularly limited and any known method may be used. For example, filtration, centrifugation, decantation and the like may be mentioned.

Figure 1:
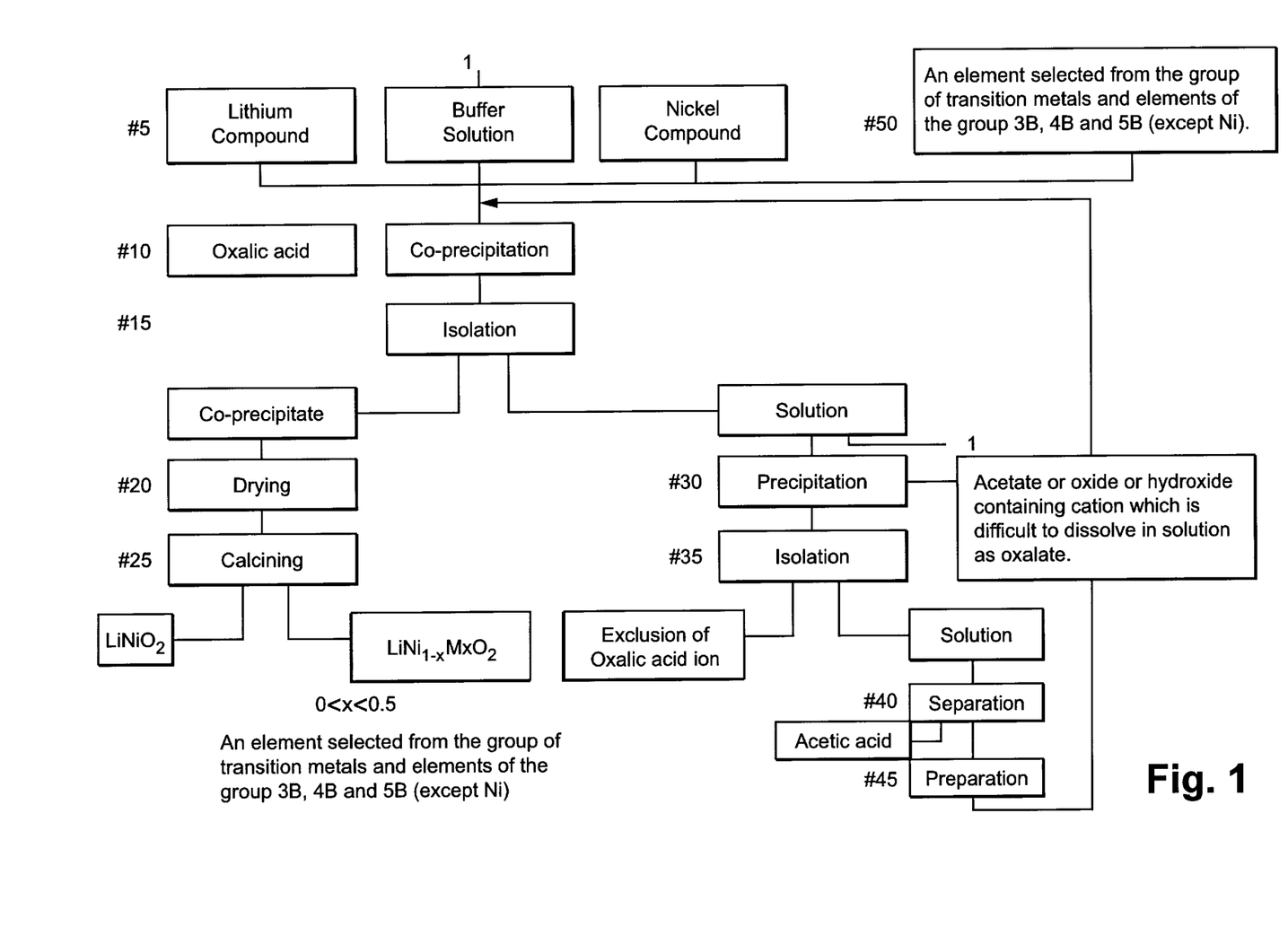
FIG. 1 is a flowchart illustrating the process for producing $LiNi_{1-x}M_xO_2$ ($0 \leq X < 0.5$, M is at least one element selected from transition metals and 3B-, 4B- and 5B-group elements) in accordance with the present invention.

Now the process for producing $LiNiO_2$ according to the present invention is described in detail with reference to FIG. 1. FIG. 1 is a flowchart illustrating a process for producing $LiNi_{1-x}M_xO_2$ in which a filtrate is recycled. Though the separation is performed by filtration in this chart, the present invention is not limited thereto. The residual liquid is represented by the filtrate in FIG. 1. Also in this figure, the compounds capable of providing lithium ions and nickel ions are represented by a water-soluble lithium compound and a water-soluble nickel compound.

In step #5, the water-soluble lithium compound and the water-soluble nickel compound are dissolved in a buffer solution to prepare an aqueous solution. Preferably the water-soluble lithium compound and the water-soluble nickel compound are used in such amount that the molar ratio of lithium to nickel is about 1:1.

It is preferable that either lithium hydroxide or lithium acetate is used as the water-soluble lithium compound in the light of the repeated recycling of the filtrate repeatedly. It is also preferable that nickel acetate is used as the nickel compound for the same reason. If the compound capable of providing lithium ions is lithium acetate or lithium hydroxide and the compound capable of providing nickel ions is nickel acetate, the process has the advantage of facilitating the adjustment of the residual liquid to similar compositions every time it is reused and being unlikely to leaving impurities through the calcination.

Further, it is preferable that an aqueous mixed solution of acetic acid with lithium acetate or lithium hydroxide is used as the buffer solution. If the buffer solution comprises acetic acid and lithium acetate, it is possible to repeat recycling of the filtrate repeatedly, reduce costs for raw materials and use resources effectively.

In the step #10, oxalic acid is added to the starting aqueous solution prepared in step #5, thereby to co-precipitate a lithium compound and a nickel compound. The lithium compound and the nickel compound in the precipitate produced by the co-precipitation are in a uniformly mixed state.

Oxalic acid may be added in a state of an aqueous solution or in a solid state. The addition of oxalic acid in an aqueous solution is preferable because uniform fine particles can be formed. The addition of solid oxalic acid is also preferable because the co-precipitation can be more easily controlled.

The addition amount of oxalic acid is preferably 1.3 to 2.5 times larger than the amount of nickel ions in the starting aqueous solution in terms of molar ratio. Where the amount does not reach 1.3 times, it is hard to control the pH of the solution and it is difficult to obtain $LiNiO_2$ by calcining the precipitate. Therefore, it is not preferable. If it is more than 2.5 times, on the other hand, a lot of impurities are contained in a $LiNiO_2$ product obtained by calcining the precipitate. Therefore, it is not preferable.

In step #15, the produced precipitate is separated by filtration, centrifugation or the like. In step #20, the precipitate obtained by filtration is dried, and in step #25, the precipitate is calcined.

Preferably the calcination is carried out at 650° C. to 900° C. in an atmosphere containing 20% to 100% of oxygen. By this calcination, crystallinity is improved and a positive electrode active material having a smaller content of residual impurities can be obtained. More preferably, the calcination is carried out at 700° C. to 850° C. in an atmosphere containing 50% to 100% of oxygen for realizing good electrode characteristics. Calcination out of the above-mentioned temperature and oxygen concentration ranges is not preferable because there are problems in that development of crystals is slow, crystals decompose and/or a lot of impurities exist in the active materials.

Next, explanation is given of the process of recycling the filtrate for repeated use for the starting aqueous solution. The present invention provides two methods for the process for recycling the filtrate.

A first filtrate recycling method is to re-use, as the buffer solution, the filtrate discharged after the produced precipitate is separated in step #15. That is, as shown by ① in FIG. 1, the process goes back to step #5 to produce the precipitate again as described above. This is repeated again and again to recycle the filtrate.

A second filtrate recycling method is to handle the filtrate as follows in order to control the concentrations of acetic acid and lithium ions in the solution with an enhanced accuracy in a repeated use of the filtrate. After the produced precipitate is filtrated in step #15, any compound of an acetate, an oxide and a hydroxide containing a cation which forms an oxalate slightly soluble in water is added to the discharged filtrate in step #30, thereby to precipitate oxalic ions in the filtrate as an oxalate containing the added cation. In step #35, the precipitated oxalate is separated and removed by filtration.

Preferable as acetates added in step #30 are acetates such as magnesium acetate, calcium acetate, strontium acetate, barium acetate, basic aluminum diacetate, silver acetate, cadmium acetate, cobalt acetate, copper acetate, iron acetate, lanthanum acetate, manganese acetate, nickel acetate, lead acetate, tin acetate, yttrium acetate and zinc acetate, among which acetates such as calcium acetate, basic aluminum diacetate and nickel acetate are more preferable from the viewpoint of cost reduction and recycle characteristics.

Also, as oxides added in step #30, calcium oxide, silver oxide, barium oxide, cadmium oxide, cobalt oxide, copper oxide, iron oxide, gallium oxide, magnesium oxide, manganese oxide, nickel oxide, tin oxide, yttrium oxide, zinc oxide and the like may be mentioned.

Also, as hydroxides added in step #30, calcium hydroxide, strontium hydroxide, aluminum hydroxide, barium hydroxide, cadmium hydroxide, cerium hydroxide, cobalt hydroxide, copper hydroxide, iron hydroxide, gallium hydroxide, magnesium hydroxide, manganese hydroxide, nickel hydroxide, yttrium hydroxide, zinc hydroxide and the like may be mentioned.

Further, in step #40, acetic acid is separated from the filtrate obtained by filtration through distillation, extraction or the like. By removing acetic acid, it is possible to turn the residual liquid into a state before the addition of oxalic acid. By this process, a repeated use of the residual liquid is facilitated. In step #45, the solution from which acetic acid has been separated is adjusted as appropriate and re-used as the starting aqueous solution before the addition of oxalic acid. Subsequently, steps #5 to #20 are repeated to obtain a precursor as described above. The precursor is then calcined. Thus, uniform $LiNiO_2$ can be produced.

The process for producing $LiNiO_2$ including the filtrate recycling process in accordance with the present invention as described above may be applied to the production of $LiNi_{1-x}M_xO_2$, wherein $0<X<0.5$ and M is at least one element selected from transition metals and 3B-, 4B- and 5B-group elements. Detailed explanation of the production process of $LiNi_{1-x}M_xO_2$, however, is omitted here since only the step of adding a compound capable of providing ions of at least one element selected from transition metals and 3B-, 4B- and 5B-group elements is added to step #5 of FIG. 1, as shown as step #50.

Preferably, as compounds capable of providing ions of at least one element selected from transition metals and 3B-, 4B- and 5B-group elements added in step #50, used are acetates such as vanadium acetate, chromium acetate, manganese acetate, cobalt acetate, copper acetate, zinc acetate, yttrium acetate and lanthanum acetate, which allow an easy recycle of the filtrate after the precipitate is filtrated out in step #15 and which are not liable to leave impurities after the precipitate is calcined at the last step.

Now, explanation is given of a nonaqueous secondary battery in which $LiNi_{1-x}M_xO_2$ produced by the production process of the present invention is used as a positive electrode active material for its positive electrode. However, the below-described process of producing a nonaqueous secondary battery should not be construed as a limitative one.

The nonaqueous secondary battery generally comprises a positive electrode, a negative electrode and an ion conductor.

The positive electrode is formed with use of a mixture of $LiNi_{1-x}M_xO_2$ (positive electrode active material), an electric conductor, a binder and in some cases a solid electrolyte and the like. As conductors, usable are carbons such as carbon black, acetylene black, and Ketchen black, graphite powders (natural graphite or artificial graphite), metal powders, metallic fibers and the like. However these are not limitative examples. As binders, usable are fluoropolymers such as polytetrafluoroethylene and polyvinylidene fluoride, polyolefins such as polyethylene, polypropylene and ethylene-propylene-diene terpolymer, styrene-butadiene rubber and the like. However, these are not limitative examples.

As regards a mix ratio of these components, 1 to 50 parts by weight of the conductor and 1 to 30 parts by weight of the binder may be used with respect to 100 parts by weight of the positive electrode active material. If the electric conductor is less than one part by weight, it becomes difficult to produce a practical secondary battery because the resistance or polarization of the electrode increases and the discharge capacity decreases. If the electric conductor is more than 50 parts by weight, the discharge capacity of the positive electrode decreases because a relative amount of the active material contained in the electrode reduces. However, the mentioned range for the amount of the conductor may vary depending upon the kind of a conductor used. If the binder is less than one part by weight, a binding force lacks. If the binder is more than 30 parts by weight, the relative amount of the active material contained in the electrode reduces as in the case of the conductor, and the resistance or polarization of the electrode increases and the discharge capacity decreases, as discussed above. Therefore it is not practical.

The mixture may be formed by a process of compressing it into a pellet or by a process of adding a proper solvent to the mixture to prepare a paste, applying the paste onto a collector, followed by drying, and compressing it into a sheet. However, these processes are not limitative. The positive electrode may be provided with a collector for sending and receiving electrons. As collectors, usable are metals themselves, alloys, carbons and the like. Examples thereof include titanium, aluminum and stainless steel. Also usable are copper, aluminum and stainless steel coated with carbons, titanium, silver, and these materials which are oxidized. Especially, aluminum and stainless steel are preferable from the viewpoint of cost saving. The collector may be in the form of a film, a sheet, a net and a lath, a perforated form, a porous form, a foam, a form of fibers or the like. The thickness thereof may be 1 $\mu$m to 1 mm, but is not particularly limited thereto.

For the negative electrode, used is/are lithium, a lithium alloy and/or a material capable of absorbing/desorbing lithium. Examples thereof include metallic lithium and lithium alloys such as lithium/aluminum alloy, lithium/tin alloy, lithium/lead alloy and Wood's alloys, further materials capable of electrochemically doping/dedoping lithium such as conductive polymers (e.g., polyacetylene, polythiophene, polyparaphenylene and the like), pyrolyzed carbons, carbons pyrolyzed in a gas phase in the presence of a catalyst, carbons produced by calcining pitch, coke, tar and the like, carbons produced by calcining polymers such as cellulose and a phenol resin, graphites (e.g., natural graphites, artificial graphites, expanded graphites and the like) capable of intercalating/deintercalating lithium, and inorganic compounds capable of doping/dedoping lithium (e.g., $WO_2$, $MoO_2$, and the like), and composites thereof.

Of the above-mentioned negative electrode active materials, if pyrolyzed carbons, carbons pyrolyzed in a gas phase in the presence of a catalyst, carbons produced by calcining pitch, coke, tar and the like, carbons produced by calcining polymers and graphites (e.g., natural graphites, artificial graphites, expanded graphites and the like) are used, secondary batteries preferable in battery characteristics, especially in safety, can be produced.

Where the negative electrode is formed with use of a conductive polymer, carbon, graphite or inorganic compound as a negative electrode active material, an electric conductor and a binder may be added. As electric conductors, usable are carbons such as carbon black, acetylene black and Ketchen black, graphite powders (e.g., natural graphite, artificial graphite), metal powders and metallic fibers. However, these are not limitative. As binders, usable are fluoropolymers such as polytetrafluoroethylene and polyvinylidene fluoride, polyolefins such as polyethylene, polypropylene and ethylene-propylene-diene terpolymer, and styrene-butadiene rubber. However, these are not limitative.

As ion conductors, usable are an organic electrolyte liquid, a solid electrolyte (e.g., polymeric solid electrolyte, inorganic solid electrolyte), a molten salt and the like. Of these ion conductors, the organic electrolytic liquid is used aptly. The organic electrolyte liquid is composed of an organic solvent and an electrolyte. As organic solvents, esters such as propylene carbonate, methylethyl carbonate, γ-butyrolactone, methyl formate and methyl acetate, tetrahydrofuran, substituted tetrahydrofurans such as 2-methyltetrahydrofuran, ethers such as dioxolane, diethyl ether, dimethoxyethane, diethoxyethane and methoxyethoxyethane, dimethylsulfoxide, sulfolane and acetonitrile, which are aprotic organic solvents. These organic solvents may be used singly or as a mixture of two or more thereof.

As electrolytes, lithium salts such as lithium perchlorate, lithium borofluoride, lithium phosphofluoride, lithium hexafluoroarsenate, lithium trifluoromethanesulfonate, a lithium halide and lithium hexafluoroarsenate may be mentioned. These electrolytes may be used singly or as a mixture of two or more thereof. The electrolyte liquid is prepared by dissolving the electrolyte in an organic solvent as selected above. However, the solvent and the electrolyte used for preparing the electrolyte liquid are not limited to the above-mentioned.

As inorganic solid electrolytes, known are, nitrides, halides and oxygen acid salts of lithium. Examples thereof include $Li_3N$, $LiI$, $Li_3N-LiI-LiOH$, $Li_4SiO_4$, $Li_4SiO_4-LiI-LiOH$, $Li_3PO_4-Li_4SiO_4$, phosphorus sulfide compounds and $Li_2SiS_3$.

As organic solid electrolytes, a material composed of the above-described electrolyte and a polymer acting to dissociate the electrolyte and a material composed of a polymer carrying an ion dissociation group may be mentioned. Examples of polymers carrying an ion dissociation group include derivatives of polyethylene oxide, polymers containing such derivatives, derivatives of polypropylene oxide, polymers containing such derivatives and polymers of phosphate. In addition, a polymeric matrix material containing the above-mentioned aprotic polar solvent, a mixture of a polymer containing an ion dissociation group with the above mentioned aprotic electrolyte liquid, and an electrolyte liquid with polyacrylonitrile added thereto may also be mentioned. The inorganic solid electrolyte and the organic solid electrolyte may be used together.

As regards a separator for retaining the electrolyte liquid, nonwoven fabrics, woven fabrics and microporous materials of electrically insulative synthetic resin fibers, glass fibers, natural fibers and the like and molded products of alumina powders may be mentioned. Among these, nonwoven fabrics and microporous materials of synthetic resins such as polyethylene, polypropylene and the like are preferable from the viewpoint of stability in quality.

Some of these nonwoven fabrics and microporous materials of synthetic resins have an additional function of, when the battery abnormally heats, melting by heat and making a block between the positive electrode and the negative electrode. Such fabrics and materials may be suitably used from the viewpoint of safety. The thickness of the separator is not particularly limited provided that it can retain a necessary amount of the electrolyte liquid and prevent the positive electrode and the negative electrode from short-circuiting. It may usually be about 0.01 mm to about 1 mm, preferably about 0.02 mm to about 0.05 mm, for example.

The shape of the battery may be a coin shape, a button shape, a sheet shape, a cylindrical shape, a cubic shape and the like. In the case of a coin- or button-shape battery, the electrodes are formed in pellets. In the case of a cylindrical or cubic battery, the electrodes are formed in sheets. The electrodes are put in a battery can and electrically connected to the can.

Subsequently, the electrolyte liquid is poured into the battery can. The opening of the battery can is sealed with a sealing plate with intervention of an insulative packing. Alternatively, it is sealed with the sealing plate and the can insulated with a hermetic seal. At this time, a safety valve provided with a safety device may be used as the sealing plate. As the safety device, an overcurrent prevention element such as a fuse, a bimetal and a PTC element may be mentioned. Also, as means for preventing rise of inner pressure of the battery can in addition to the safety valve, a crack may be made on a gasket or the sealing plate, or a notch may be made on the battery can. Further, an external circuit may be used which has an integrated countermeasure against overcharge and overdischarge.

The electrodes in the pellet or sheet form are preferably dried and dehydrated beforehand. For drying and dehydrating, a common method may be used. For example, heated air, vacuum, infrared, far-infrared, electron beams, low-moisture air and the like may be used singly or as a combination. Temperature is preferably within the range of 50° C. to 380° C.

Explanation is now given of examples according to the present invention and results of tests on their characteristics together with comparative examples according to the conventional techniques.

EXAMPLES 1 to 3

Lithium acetate and acetic acid were dissolved in water in a molar ratio of 1:1 to obtain a buffer solution. In the buffer solution, dissolved were 0.03 moles of anhydrous lithium hydroxide and 0.03 moles of nickel acetate tetrahydrate. Powdery oxalic acid was added to the resulting aqueous solution, which was stirred at room temperature for two hours. The added amount of oxalic acid was 0.045 moles.

The precipitate produced by co-precipitation by adding oxalic acid was filtered off and dried. The resulting precipitate was calcined at 700° C. in an oxygen atmosphere for ten hours. The resulting calcined matter was pulverized. This is referred to as Example 1.

The filtrate discharged when the precipitate was filtered off was used again as the buffer solution for co-precipitation. More particularly, 0.03 moles of lithium acetate and 0.03 moles of nickel acetate tetrahydrate were added to the filtrate, to which 0.045 moles of powdery oxalic acid was added. The resulting mixture was stirred at room temperature for two hours. The produced precipitate was filtered off, dried and calcined under the same conditions as in Example 1. The resulting calcined matter was pulverized and referred to as Example 2.

Subsequently to Example 2, the filtrate was used again as the buffer solution to obtain a calcined matter by the same process as described above. The calcined matter was pulverized and referred to as Example 3.

$LiNiO_2$ thus obtained were used as active materials for producing electrodes. $LiNiO_2$ were each mixed with acetylene black as a conductor and polytetrafluoroethylene as a binder in a ratio of 100:10:10 in a mortar. A mesh of titanium as a collector was added to the resulting mixture and formed by pressing into a pellet of 20 mm diameter and 0.10 g weight. A wire of titanium was spot-welded to the titanium mesh for collection of electricity. Thus electrodes for evaluation were produced.

The electrodes were evaluated by a three-electrode method using lithium as a counter electrode and a reference electrode. As an electrolytic liquid, used was lithium perchlorate dissolved in a ratio of 1 M in a solvent of ethylene carbonate and ethylmethyl carbonate mixed in a volume ratio of 1:1. Charge-discharge current density was set to 27.4 mA/g. First, the reference electrode of lithium was charged up to 4.2 V at a constant current. Subsequently, a constant-current discharge was conducted to 2.7 V. Then, charge and discharge were repeated within the same voltage range at the same current density in the second charge/discharge cycle and later. As a result, the first discharge capacities of Examples 1 to 3 were 170 mAh/g, 173 mAh/g and 175 mAh/g, respectively.

Next, $LiNiO_2$ were synthesized according to four processes for producing LiNiO2 of the conventional techniques. Electrodes using the synthesized $LiNiO_2$ were evaluated and the results are hereafter shown.

COMPARATIVE EXAMPLE 1

This comparative example represents a process for producing $LiNiO_2$ by mixing a lithium compound and a nickel compound, which are both solid. Lithium hydroxide and nickel oxyhydroxide were weighed so that the molar ratio of lithium to nickel (lithium/nickel) was 1:1 and then were mixed in a mortar. A pressure of 100 $kg/cm^2$ was applied to the resulting mixture to produce a pellet, which was then calcined at 800° C. in an oxygen atmosphere for two hours. The calcined matter was pulverized. This is referred to as Comparative Example 1.

The production and evaluation of an electrode were carried out in accordance with the above-described Examples 1 to 3. As a result, the first discharge capacity was 124 mAh/g.

COMPARATIVE EXAMPLE 2

This comparative example represents a process for producing $LiNiO_2$ by mixing an aqueous solution of a lithium compound and an aqueous solution of a nickel compound. Lithium hydroxide and nickel chloride were weighed so that the molar ratio of lithium to nickel (lithium/nickel) was 1:1 and then were dissolved in water to form aqueous solutions. The aqueous solution of lithium hydroxide was gradually poured into the aqueous solution of nickel chloride with stirring at 30° C. for five hours. The resulting mixed solution was dried at 90° C. to 100° C. A solid was obtained and pulverized. The resulting matter was formed into a pellet by applying a pressure of 100 $kg/cm^2$. The pellet was the calcined at 800° C. in an oxygen atmosphere for two hours. The calcined matter was pulverized. This is referred to as Comparative Example 2.

The production and evaluation of an electrode were carried out in accordance with the above-described Examples 1 to 3. As a result, the first discharge capacity was 120 mAh/g.

COMPARATIVE EXAMPLE 3

This comparative example represents a process for producing $LiNiO_2$ by adding water as a dispersant to a lithium compound and a nickel compound, which are both solid. Lithium hydroxide and nickel hydroxide were weighed so that the molar ratio of lithium to nickel (lithium/nickel) was 1:1, and then were mixed in a mortar with a small amount of water as a dispersant. The resulting mixture was dried at 90° C. to 100° C. The resulting solid was pulverized and formed into a pellet by applying a pressure of 100 $kg/cm^2$. The pellet was then calcined at 800° C. in an oxygen atmosphere for two hours. The calcined matter was pulverized. This is referred to as Comparative Example 23.

The production and evaluation of an electrode were carried out in accordance with Examples 1 to 3. As a result, the first discharge capacity was 110 mAh/g.

COMPARATIVE EXAMPLE 4

This comparative example represents a process for producing $LiNiO_2$ by mixing a solid nickel compound with an aqueous solution of a lithium compound. Lithium chloride and nickel oxide were weighed so that the molar ratio of lithium to nickel (lithium/nickel) was 1:1. Lithium chloride was dissolved in water to produce an aqueous solution, which was gradually poured to solid nickel oxide. The resulting mixture was kneaded at 30° C. for five hours, and was dried at 90° C. to 100° C. The resulting solid was pulverized and formed into a pellet by applying a pressure of 100 $kg/cm^2$. The pellet was calcined at 800° C. in an oxygen atmosphere for two hours. The calcined matter was pulverized. This is referred to as Comparative Example 4.

The production and evaluation of an electrode were carried out in accordance with the above-described Examples 1 to 3. As a result, the first discharge capacity was 127 mAh/g.

As the results of evaluation of the performance of the electrodes by use of $LiNiO_2$ of Examples 1 to 3, high values of 170 mAh/g or more were obtained as initial discharge capacity. These values were found higher by over about 50 mAh/g than those of the electrodes produced by use of $LiNiO_2$ of Comparative Examples 1 to 4.

Next, the buffer solution used in Example 1 were prepared in three vessels. Precipitates were obtained from the three vessels of buffer solution in the same manner as in Examples 1 to 3. Precipitates obtained from the first buffer solution were referred to as Sample 1. In the same manner, precipitates obtained from the second solution and third buffer solution were referred to as Samples 2 and 3, respectively.

The molar ratio of lithium and nickel (lithium/nickel) in the obtained nine precipitates was measured by ICP light emission spectrometry. Table 1 shows the lithium/nickel ratio in the precipitates.

TABLE 1

|  | Sample 1 | Sample 2 | Sample 3 |
|---|---|---|---|
| Example 1 | 1.12 | 1.06 | 0.98 |
| Example 2 | 1.01 | 1.06 | 1.04 |
| Example 3 | 1.05 | 1.03 | 1.04 |

These precipitates were calcined. Electrodes were produced using the calcined matters as active materials, and evaluated. The production and evaluation of the electrodes were carried out in accordance with the above-described Examples 1 to 3. Table 2 shows the discharge capacity (mAh/g) at the first charge/discharge cycle.

TABLE 2

|  | Sample 1 | Sample 2 | Sample 3 |
|---|---|---|---|
| Example 1 | 168 | 166 | 170 |
| Example 2 | 170 | 172 | 173 |
| Example 3 | 174 | 173 | 173 |

The results in Tables 1 and 2 show that by repeatedly using the filtrate discharged when the precipitate was filtered off, the control of the lithium/nickel ratio in the precipitate became easy and the uniformity of the precipitate was improved. Furthermore, the initial electrode characteristics were greatly improved when $LiNiO_2$ produced by calcining the precipitate was used as an active material for the electrode.

EXAMPLE 4

Lithium acetate and acetic acid were dissolved in water so that the molar ratio was 1:1, to prepare a buffer solution. In the buffer solution, 0.03 moles of anhydrous lithium hydroxide and 0.03 moles of nickel acetate tetrahydrate were dissolved. Powdery oxalic acid was added to the resulting aqueous solution, followed by stirring at room temperature for two hours. The added amount of oxalic acid was 0.045 moles.

A precipitate produced by adding oxalic acid was filtered off. To the filtrate obtained at the filtration, calcium acetate was added to precipitate oxalic ions present in the filtrate as calcium oxalate. The precipitated calcium oxalate was removed by filtration. Further excess acetic acid contained in the filtrate was removed by distillation. The filtrate was then adjusted in consideration of the concentration of acetic acid and lithium ions. In the resulting solution, 0.03 moles of lithium acetate and 0.03 moles of nickel acetate tetrahydrate were dissolved. Powdery oxalic acid was added to the solution, which was stirred at room temperature for two hours. The resulting precipitate was filtered off, dried and calcined at 700° C. in an oxygen atmosphere for ten hours. The calcined matter was pulverized. This is referred to as Example 4.

The production and evaluation of an electrode were carried out in accordance with the above-described Examples 1 to 3. As a result, the first discharge capacity was 175 mAh/g.

Next, the buffer solution used in Example 4 were prepared in three vessels. Precipitates were obtained from the three vessels of buffer solutions in the same manner as in Example 4. The molar ratio of lithium and nickel (lithium/nickel) in the resulting three precipitates was measured by ICP light emission spectrometry. The precipitates had lithium/nickel ratios of 1.05, 1.04 and 1.04, respectively.

Further, the resulting precipitates were calcined. Electrodes were produced using the resulting calcined matters, and evaluated. The production and evaluation of the electrodes were carried out in accordance with the above-described Examples 1 to 3. As a result, the electrodes exhibited first discharge capacities of 176 mAh/g, 176 mAh/g and 175 mAh/g.

From the above results, in the production process of $LiNiO_2$ of Example 4, in which a solution was prepared from the filtrate so as to contain acetic acid and lithium ions in a more accurate concentration when the filtrate was used repeatedly, the resulting precipitates had smaller variations in the lithium/nickel ratio, and precursors of the active material were obtained which had an improved mixture state. $LiNiO_2$ produced by calcining the precursors was recognized as active materials which provided excellent initial electrode characteristics.

EXAMPLE 5 to 10 AND COMPARATIVE EXAMPLES 5 to 7

Lithium acetate and acetic acid were dissolved in water so that the molar ratio was 1:1, to prepare a buffer solution. In the buffer solution, 0.3 moles of anhydrous lithium hydroxide and 0.3 moles of nickel acetate tetrahydrate were dissolved. Powdery oxalic acid was added to the resulting aqueous solution, followed by stirring at room temperature for two hours. The added amount of oxalic acid was 0.45 moles.

After a precipitate produced by adding oxalic acid was filtered off, 0.3 moles of lithium acetate and 0.3 moles of nickel acetate tetrahydrate were dissolved in the filtrate, to prepare a solution. To the aqueous solution, 0.45 moles of powdery oxalic acid were added, followed by stirring at room temperature for two hours. The aqueous solution in which a precipitate was produced by the addition of oxalic acid was filtered, and the resulting precipitate was dried. In these examples, the precipitate was calcined at different temperatures in order to study the relationship between the calcination temperature and the performance of electrodes produced using $LiNiO_2$ which were calcined matters.

More particularly, the precipitate was calcined at 600° C., 650° C., 700° C., 750° C., 800° C., 850° C., 900° C., 940° C. and 980° C. The calcination time was five hours and the calcination was carried out in an oxygen atmosphere in each case. The resulting calcined matters are referred to as Comparative Example 5, Examples 5 to 10 and Comparative Examples 6 and 7.

Electrodes were produced using $LiNiO_2$ produced by the above-described production process as active materials. Here, the process for producing the electrode, the weight and size of pellets and the like were in accordance with the above-described Examples 1 to 3 except that $LiNiO_2$, acetylene black as the conductor and polytetrafluoroethylene as the binder were mixed in a ratio of 100:8:10.

Also the evaluation of the electrodes was carried out in accordance with the above-described Examples 1 to 3 except that 1.0M solution of lithium perchlorate in a mixture solvent of 1:1 by volume of ethylene carbonate and diethyl carbonate was used as the electrolyte.

Figure 2:
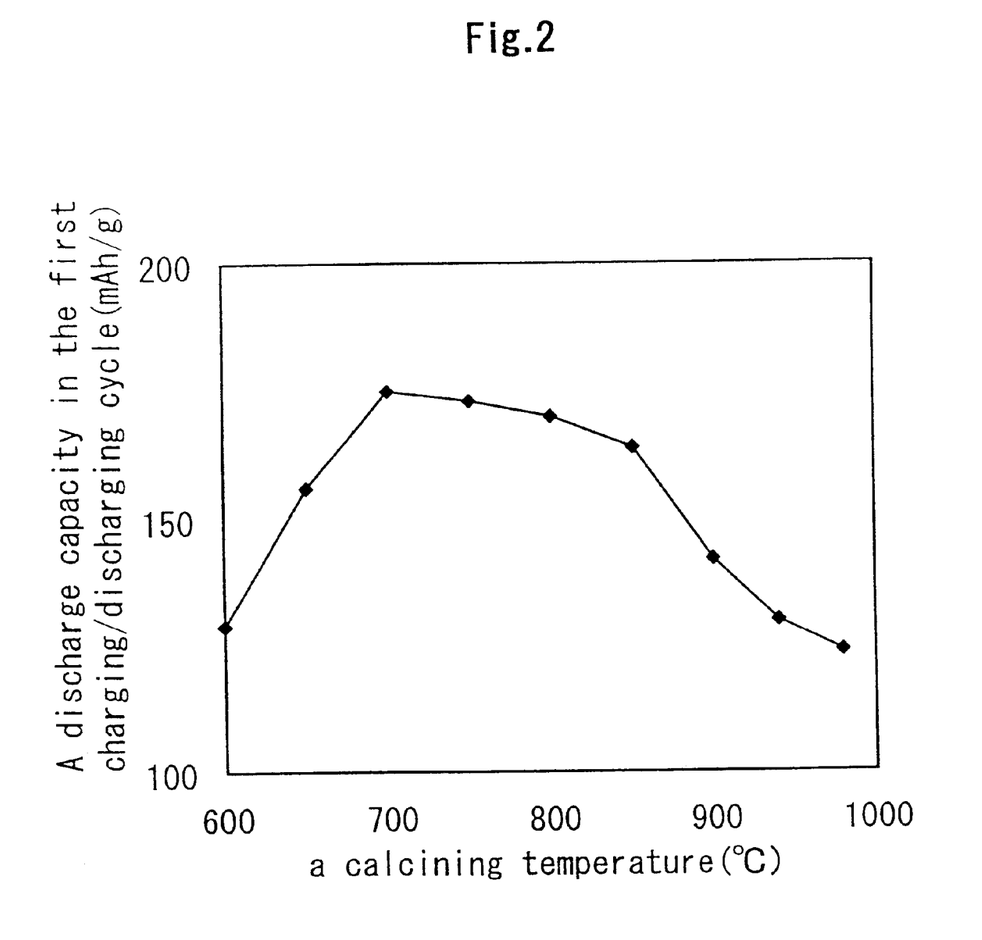
FIG. 2 is a graphical representation showing a relationship between calcination temperatures and an initial discharge capacities in Examples 5 to 10 and Comparative Examples 5 to 7.

FIG. 2 is a graphical representation showing a relationship between calcination temperature and the first discharge capacity. It is understood that even in the case where the solution after the precipitate was filtered off was used again for obtaining a precipitate and the resulting precipitate was calcined to produce $LiNiO_2$, good initial electrode characteristics were provided. Also a high discharge capacity was realized when the calcination temperature was 650° C. to 900° C., preferably 700° C. to 850° C. Therefore, it is recognized that an electrode which exhibits good initial electrode characteristics can be obtained by setting the calcination temperature at 650° C. to 900° C.

EXAMPLES 11 to 16 AND COMPARATIVE EXAMPLES 8 to 10

Lithium acetate and acetic acid were dissolved in water so that the molar ratio thereof was 1:1, to prepare a buffer solution. In the buffer solution, 0.3 moles of anhydrous lithium hydroxide, 0.24 moles of nickel acetate tetrahydrate and 0.06 moles of cobalt acetate were dissolved. Powdery oxalic acid was added to the resulting aqueous solution, followed by stirring at room temperature for two hours. The added amount of oxalic acid was 0.45 moles.

After a precipitate produced by addition oxalic acid was filtered off, 0.3 moles of lithium acetate, 0.24 moles of nickel acetate and 0.06 moles of cobalt acetate were dissolved in the filtrate to prepare a solution. To the resulting aqueous solution, 0.45 moles of powdery oxalic acid was added, followed by stirring at room temperature for two hours. The aqueous solution in which a precipitate was generated by adding oxalic acid was filtered and the resulting precipitate was dried. In these examples, the precipitate was calcined at different temperatures in order to study the relationship between the calcination temperature and the performance of electrodes produced using $LiNi_{0.8}Co_{0.2}O_2$ which were calcined matters.

More particularly, the precipitate was calcined at 600° C., 650° C., 700° C., 750° C., 800° C., 850° C., 900° C., 940° C. and 980° C. The calcination time was five hours and the calcination was carried out in an oxygen atmosphere in each case. The resulting calcined matters are referred to as Comparative Example 8, Examples 11 to 16 and Comparative Examples 9 and 10.

Electrodes were produced using $LiNi_{0.8}Co_{0.2}O_2$ produced by the above-described production process as active materials. Here, the process for producing the electrodes, the weight and size of pellets and the like were in accordance with the above-described Examples 1 to 3 except that $LiNi_{0.8}Co_{0.2}O_2$, acetylene black as the conductor and polytetrafluoroethylene as the binder were mixed in a ratio of 100:8:10.

Also the evaluation of the electrodes was carried out in accordance with the above-described Examples 1 to 3 except that 1.0M solution of lithium perchlorate in a solvent of 1:1 by volume of ethylene carbonate and diethyl carbonate was used as the electrolyte.

Figure 3:
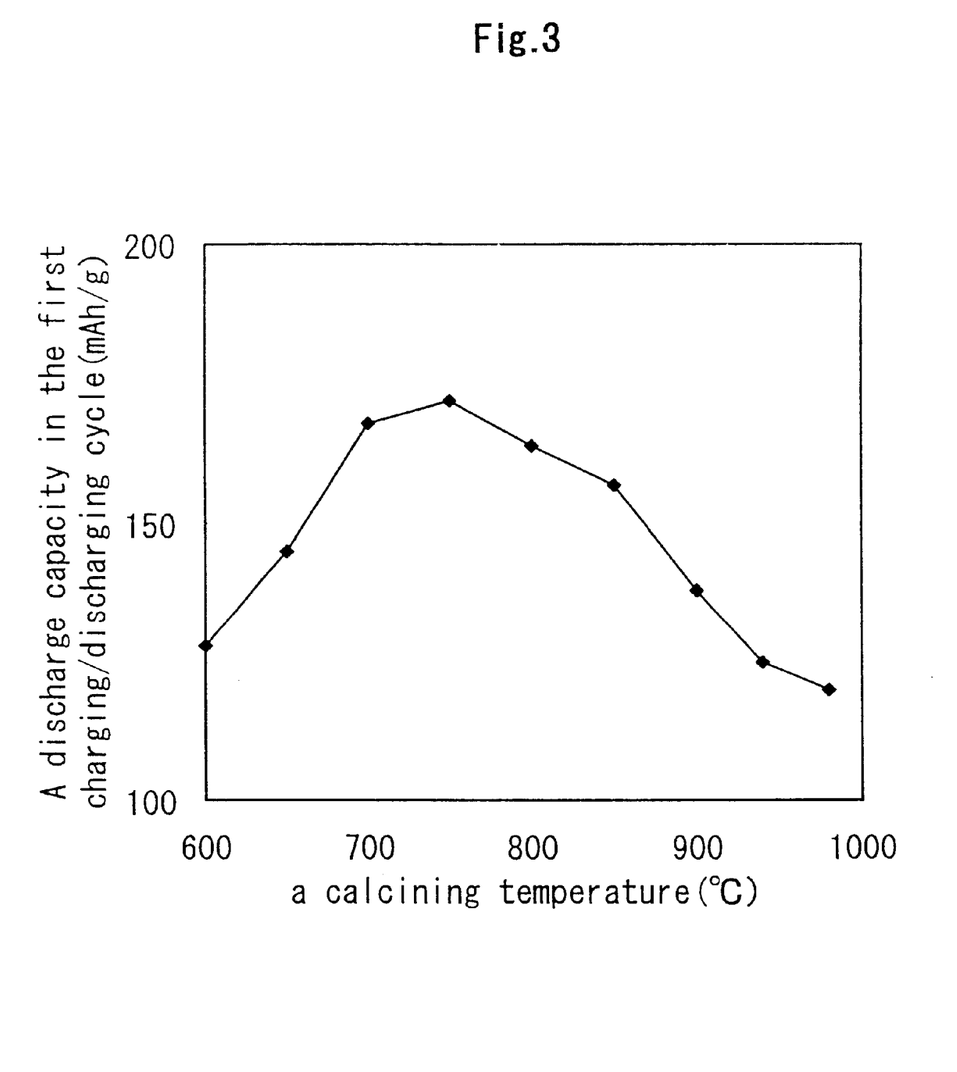
FIG. 3 is a graphical representation showing a relationship between calcination temperatures and the initial discharge capacities in Examples 11 to 16 and Comparative Examples 8 to 10.

FIG. 3 is a graphical representation showing a relationship between calcination temperature and the first discharge capacity. It is understood that even in the case where the solution after the precipitate was filtered off was used for obtaining a precipitate again and the resulting precipitate was calcined to produced $LiNi_{0.8}Co_{0.2}O_2$, good initial electrode characteristics were provided. Also a high discharge capacity was realized when the calcination temperature was 650° C. to 900° C., preferably 700° C. to 850° C. Therefore, it is recognized that an electrode which exhibits good initial electrode characteristics can be obtained by setting the calcination temperature at 650° C. to 900° C.

EXAMPLES 17 to 22 AND COMPARATIVE EXAMPLE 11 to 18

0.3 moles of Lithium acetate and 0.3 moles of acetic acid were dissolved in water so that the molar ratio was 1:1, to prepare a buffer solution. In the buffer solution, 0.3 moles of anhydrous lithium hydroxide and 0.3 moles of nickel acetate tetrahydrate were dissolved. Powdery oxalic acid was added to the resulting aqueous solution, followed by stirring at room temperature for two hours. The added amount of oxalic acid was 0.45 moles.

A precipitate produced by adding oxalic acid was filtered off, and the resulting precipitate was dried. In these examples, the precipitate was calcined in atmospheres containing oxygen in different ratios by volume in order to study the relationship between the ratio of oxygen by volume and the discharge capacity of electrodes produced using the resulting $LiNiO_2$.

More particularly, the precipitate was calcined in an atmosphere of a mixture of oxygen and nitrogen having an oxygen ratio by volume of 10%, 20% (in air), 30%, 50%, 70%, 80% or 100%. The calcination was performed at 700° C. for eight hours in each case. The resulting calcined matters were pulverized. The resulting calcined matters are referred to as Comparative Examples 11 to 17.

The filtrate obtained after the precipitate was filtered off was prepared into a solution in the same manner as in the above-described Example 4. Thereafter, 0.3 moles of lithium acetate and 0.3 moles of nickel acetate were dissolved in the solution. To the resulting solution, 0.45 moles of powdery oxalic acid were added, followed by stirring at room temperature for two hours. The produced precipitate was filtered off and dried, and then calcined in the atmospheres having the above-mentioned various oxygen concentrations.

More particularly, the precipitate was calcined in an atmosphere having an oxygen ratio by volume of 10%, 20% (in air), 30%, 50%, 70%, 80% or 100%. The calcination was performed at 700° C. for eight hours in each case. The resulting calcined matters were pulverized. The resulting calcined matters are referred to as Comparative Examples 18 and Examples 17 to 22.

Electrodes were produced using $LiNiO_2$ produced by the above-described production process as active materials. Here, the process for producing the electrodes, the weight and size of pellets and the like were in accordance with the above-described Examples 1 to 3 except that $LiNiO_2$, acetylene black as the conductor and polytetrafluoroethylene as the binder were mixed in a ratio of 100:15:8.

Also the evaluation of the electrodes was carried out in accordance with the above-described Examples 1 to 3 except that 1.0M solution of lithium phosphofluoride in a mixture solvent of 1:1 of propylene carbonate and dimethyl carbonate by volume was used as the electrolyte.

Figure 4:
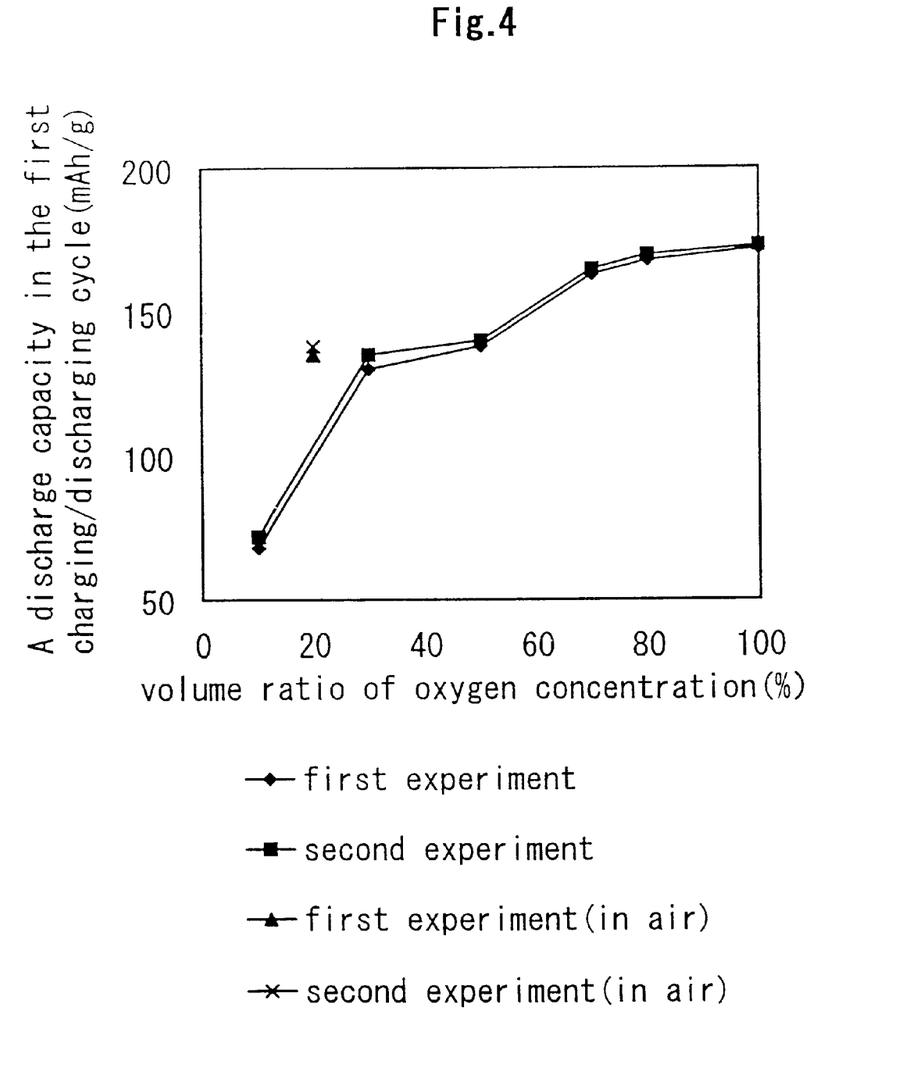
FIG. 4 is a graphical representation showing relationship between the concentrations of oxygen in a calcination atmosphere and the initial discharge capacities in Examples 17 to 22 and Comparative Examples 11 to 18.

FIG. 4 is a graphical representation showing the relationship between the concentration of oxygen in a calcination atmosphere and the discharge capacity at the first charge/discharge cycle. It is understood that even in the case where the solution after the precipitate was filtered off was used for obtaining a precipitate again and the resulting precipitate was calcined to produced $LiNiO_2$, good initial electrode characteristics were provided. Also a high discharge capacity was realized when the oxygen concentration was 20% or higher, preferably 50% or higher, more preferably 80% or higher. Therefore, it is recognized that an electrode which exhibits good initial electrode characteristics can be obtained by setting the oxygen concentration in the calcination atmosphere to 20% or higher.

EXAMPLE 23

In this example, a simple cell was produced using $LiNiO_2$ produced by the production process of the present invention as the positive electrode active material, and the produced cell was examined on its charge/discharge characteristics. A positive electrode was formed in a pellet of 15 mm diameter and 50 mg weight in accordance with the production process described in Example 2.

As the negative electrode active material, used was a pyrolyzed carbon (the interplonar distance d(002) between (002) plane and adjacent parallel plane: 0.337 nm, the thickness (Lc) of crystal layer in the direction of plane (002): 15 nm, the intensity ratio (R value) of a peak near 1360 $cm^{-1}$ to a peak near 1580 $cm^{-1}$ of scattering spectrum by argon laser Raman spectroscopy: 0.45).

Propane as a starting material was pyrolyzed in a gas phase at 750° C. under atmospheric pressure for two hours and deposited on a substrate of nickel mesh (of 4 $cm^2$ surface area). A nickel wire was spot-welded for collection of electricity and dried at 200° C. under a reduced pressure for removing moisture. Thus a negative electrode (of 35 mg weight) was obtained.

An electrolytic liquid of lithium perchlorate dissolved in a ratio of 1M in a mixture solvent of 1:1 by volume of propylene carbonate and diethyl carbonate was put in a beaker-formed cell. The above-mentioned positive and negative electrodes were immersed in the electrolytic liquid.

The resulting cell was tested on its charge/discharge characteristics as follows: The cell was charged at a constant current of 0.2 mA up to the upper limit voltage of 4.4V and discharged constantly at the same current to 2.5V. Charge and discharge were repeated in the same manner in the second cycle and later. As a result, the discharge capacity in the first cycle was 7.9 mAh and that in the tenth cycle was 7.1 mAh.

EXAMPLE 24

In this example, charge/discharge test were carried out on a coin-type cell in accordance with the present invention. A positive electrode was prepared in the form of a pellet of 15 mm diameter, 0.75 mm thickness and 0.20 g weight using $LiNiO_2$ obtained by the production process of Example 2.

A negative electrode was prepared by the following process: As the negative electrode active material, used was natural graphite from Madagascar (in the form of scales, the particle diameter: 11 $\mu$m, the interplonar distance d(002) between (002) plane and adjacent parallel plane: 0.337 nm, the thickness (Lc) of crystal layer in the direction of plane (002): 27 nm, expansion (La) of crystalline layer in the direction of the (002) plane: 17 nm, the intensity ratio (R value) of a peak near 1360 $cm^{-1}$ to a peak near 1580 $cm^{-1}$ of scatter spectrum by argon laser Raman spectroscopy: 0, the specific surface area: 8 $m^2/g$).

The natural graphite was mixed with polytetrafluoroethylene as the binder in a ratio of 10:1. A nickel mesh was added as the collector to the resulting mixture. The resulting mixture was formed by pressing into a pellet of 15 mm diameter, 0.59 mm thickness and 0.1 g weight. The pellet was dried at 200° C. under a reduced pressure for removing moisture.

Figure 5:
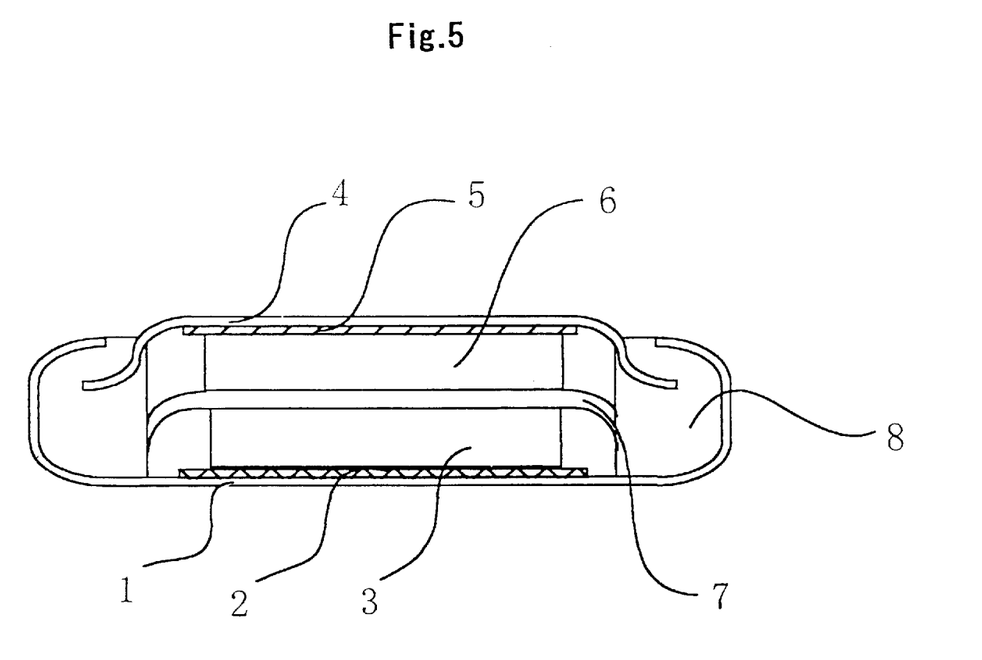
FIG. 5 is a sectional view illustrating a construction of a coin-type battery in accordance with the present invention.

The construction of a coin-type cell using these electrodes was as follows: FIG. 5 illustrates a sectional view of a coin-type cell in accordance with the present invention. An insulative packing 8 was placed in a positive electrode can 1 shaped in a short cylinder along the inner side of the can. A positive electrode 3 with a positive electrode collector 2 integrated therein was contact-bonded interiorly to the insulative packing 8 in the can 1.

At that time, the positive electrode collector 2 contacted the bottom of the positive electrode can 1. On the positive electrode 3, a separator 7 of polypropylene nonwoven and a negative electrode 6 with a negative electrode collector 5 integrated therein were disposed in this order from bottom to top. The separator 7 was impregnated with an electrolytic liquid of lithium phosphofluoride dissolved in a ratio of 1M in a mixture solvent of 1:1 by volume of ethylene carbonate and diethyl carbonate.

A negative electrode can 4 was put on the negative electrode 6. The negative electrode can 4 and the positive electrode can 1 were sealed by caulking with intervention of the insulative packing 8. Thereby, the negative electrode 6 was contact-bonded to the negative electrode can 4, and particularly the negative electrode collector 5 contacted the inside surface of the negative electrode can 4.

The coin-type cell was tested on its charge/discharge characteristics as follows: The cell was charged to the upper limit voltage of 4.4V and discharged to 2.5V, at a constant current of 1 mA. Charge and discharge were repeated at the same current within the same range of voltage in the second cycle and later.

As a result, the discharge capacity in the first cycle was 28.5 mAh and that in the 100th cycle was 25.0 mAh.

EXAMPLE 25

In this example, charge/discharge test was carried out on a cylindrical cell in accordance with the present invention. First, a sheet-form positive electrode was prepared. A positive electrode active material, $LiNiO_2$, was prepared by the production process of Example 2.

The electrode using this $LiNiO_2$ as the active material was produced as follows: $LiNiO_2$ was mixed with acetylene black as the conductor and polyvinylidene fluoride as the binder in a mix ratio of 100:7:10. N-methyl-2-pyrrolydone was added as a dispersant to the resulting mixture, which was further mixed to obtain a positive electrode paste.

The positive electrode paste was applied onto both faces of an aluminum foil (of 20 $\mu$m thickness) which was to be a collector, followed by drying. The foil was subjected to rolling and then cut in straps. The weight of the active electrode per unit area of the positive electrode was 40 $mg/cm^2$. An aluminum tab as a positive electrode lead was spot-welded to an end of the positive electrode.

As a negative electrode active material, used was artificial graphite (the particle diameter : 8 $\mu$m, the interplonar distance d(002) between (002) plane and adjacent parallel plane: 0.337 nm, the thickness (Lc) of crystal layer in the direction of the (002) plane: 25 nm, expansion (La) of crystalline layer in the direction of plane (002): 13 nm, the intensity ratio (R value) of a peak near 1360 $cm^{-1}$ to a peak near 1580 $cm^{-1}$ of scattering spectrum by argon laser Raman spectroscopy: 0, the specific surface area: 12 $m^2/g$). The artificial graphite was mixed with polyvinylidene fluoride as the binder in a ratio of 100:10.

To the resulting mixture, N-methyl-2-pyrrolidone was further added as a dispersant to obtain a negative electrode paste. The negative electrode was applied onto both faces of a copper foil (of 18 $\mu$m thickness), followed by drying. The foil was subjected to rolling and cut in straps. The weight of the active material per unit area of the negative electrode was 20 $mg/cm^2$. A nickel tab was spot-welded as a negative electrode lead to an end of the negative electrode.

Figure 6:
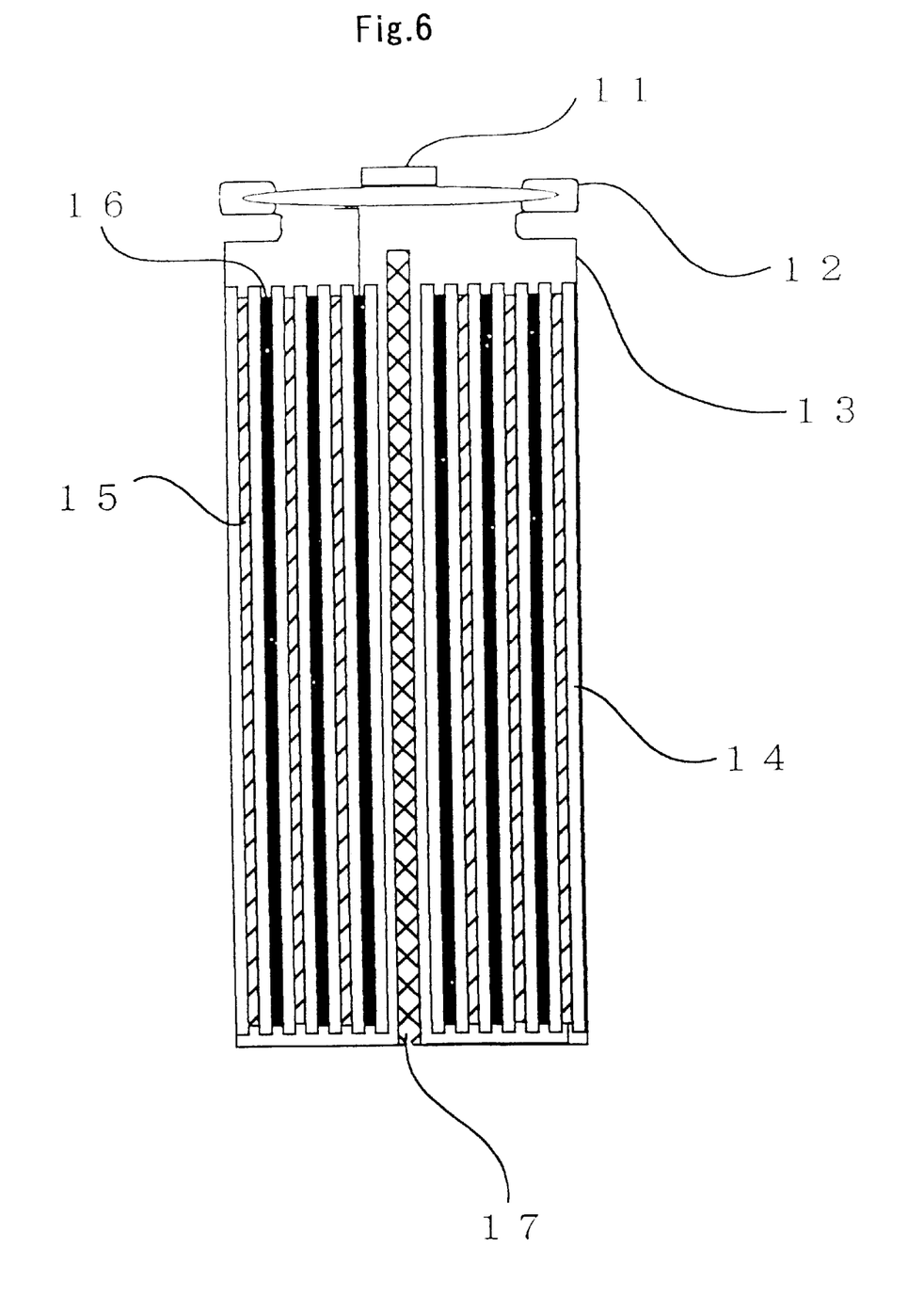
FIG. 6 is a sectional view illustrating a construction of a cylinder-type battery in accordance with the present invention.

The construction of the cylindrical cell using these electrodes was as follows: FIG. 6 illustrates a sectional view of a cylindrical cell in accordance with the present invention. In this figure, hatching indicating cross section is omitted with a positive electrode cover 11, an insulative packing 12 and a separator 14. The separator 14 was of microporous polyethylene and sandwiched between one positive electrode 16 and one negative electrode 15. These were rolled in a spiral in an opposed relation and formed a cylindrical rolled element The cylindrical rolled element was accommodated in a cylindrical cell can (of stainless steel with a diameter of 17 mm and a height of 50 mm) with the positive and negative electrode leads taken out from the upper face and the lower face of the element, respectively. The positive electrode lead was attached to the positive electrode cover with a safety valve and the negative electrode lead to the bottom of the cell can, by spot welding. A center pin 17 (a tube of stainless steel with a diameter of 3.4 mm and a length of 40 mm) was inserted at the center of the rolled element for preventing roll shifting.

An electrolytic liquid of lithium phosphofluoride dissolved in a ratio of 1M in a mixture solvent of 1:1 by volume of ethylene carbonate and diethyl carbonate was put in the cell can as an electrolyte. The positive electrode cover 11 and the cell can 13 were sealed by caulking with intervention of the insulative packing 12.

The produced cylindrical cell was tested on its charge/discharge characteristics as follows: In a constant temperature bath at 25° C., a constant-current constant-voltage charge at 500 mA to the upper voltage of 4.2V was carried out for three hours and a constant-current discharge was carried out at 100 mA to the lower limit voltage of 2.75 V. Charge/discharge in the second cycle and later was similarly carried out. As a result, the discharge capacity in the first charge/discharge cycle was 918 mAh and that in the 50th cycle was 805 mAh. Therefore, it was found that the nonaqueous secondary cell of the present invention did not lost the discharge capacity during repeated charge/discharge.

As described above, according to the process for producing $LiNi_{1-x}M_xO_2$ of the present invention characterized by dissolving a nickel compound and a lithium compound as starting materials in a buffer solution, adding oxalic acid for co-precipitation and re-using a filtrate discharge when a precipitate is filtered off, to obtain a precursor repeatedly, it is possible to repeatedly obtain more uniform precursors with less variation in the molar ratio of lithium to nickel (lithium/nickel).

Further, by separating oxalic ions and acetic acid from the filtrate obtained when the precipitate is filtered off and preparing a solution from the filtrate so that a more accurately controlled concentration is provided for acetic acid and lithium ions therein, the uniformity of the precursors are more stabilized.

Also, since the precipitate of precursors of $LiNi_{1-x}M_xO_2$ is obtained with repeated use of the filtrate, which is adjusted into a state before oxalic acid is added, the starting materials need not be used in an excess amount for every production. This leads to reduction in costs and efficient utilization of resources.

With the nonaqueous secondary battery of the present invention using $LiNi_{1-x}M_xO_2$ obtained by calcining the precursor as an active material for the positive electrode, a high initial discharge capacity can be obtained. Further, the nonaqueous secondary batter of the present invention does not decrease the discharge capacity significantly during repeated charge/discharge. Therefore, it will be a long-life secondary battery.

What is claimed is:

1. A process for producing a positive electrode active material for a nonaqueous secondary battery comprising the steps of:

(a) dissolving compounds capable of providing lithium ions, nickel ions and optionally ions of at least one element selected from the group consisting of transition metals, 3B-group elements, 4B-group elements and 5B-group elements in a buffer solution containing at least lithium ions, thereby to prepare a starting aqueous solution;

(b) adding oxalic acid to the starting aqueous solution to form a precipitate of oxalates of said ions and separating the precipitate;

(c) calcining the resulting precipitate to produce $LiNi_{1-x}M_xO_2$, wherein $0 \leq X < 0.5$ and M is at least one element selected from the group consisting of the transition metals, 3B-group elements, 4B-group elements and 5B-group elements; and (d) re-using a residual liquid after the precipitate is separated for preparing the starting aqueous solution.

2. A process according to claim 1, wherein the residual liquid is re-used as the buffer solution.

3. A process according to claim 1, wherein the ions of the oxalic acid are removed with calcium acetate.

4. A process according to claim 1, wherein the calcination is carried out at 650° C. to 900° C. in air or in an atmosphere in which the ratio of oxygen by volume is 21% to 100%.

5. A process according to claim 1, wherein the compound capable of providing lithium ions is lithium acetate or lithium hydroxide and the compound capable of providing nickel ions is nickel acetate.

6. A process according to claim 1, wherein the buffer solution contains acetic acid and lithium acetate.

7. A process according to claim 6, wherein the residual liquid is re-used after removal of oxalic acid ions from the residual liquid and subsequent separation of acetic acid from the residual liquid.

* * * * *